United States Patent [19]
Winton

[11] 3,753,444
[45] Aug. 21, 1973

[54] DEVICE FOR COMBINING AND MIXING LIQUIDS

[76] Inventor: Herbert D. Winton, 4115 Picaso, Woodland Hills, Calif.

[22] Filed: Sept. 9, 1971

[21] Appl. No.: 179,075

[52] U.S. Cl............................... 137/268, 23/272.7
[51] Int. Cl............................................ F16k 51/00
[58] Field of Search.................... 137/268; 23/272.8, 23/272.7, 272.6, 267.2, 267.4

[56] References Cited
UNITED STATES PATENTS

| | | | |
|---|---|---|---|
| 811,749 | 2/1906 | Somers | 23/272.7 |
| 2,461,067 | 2/1949 | Lewis | 23/272.7 |
| 2,758,877 | 8/1956 | Gleason | 23/272.7 |

FOREIGN PATENTS OR APPLICATIONS

| | | | |
|---|---|---|---|
| 1,132,867 | 7/1962 | Germany | 137/268 |

Primary Examiner—Henry T. Klinksiek
Assistant Examiner—Robert J. Miller
Attorney—Albert M. Herzig and Edward C. Walsh

[57] ABSTRACT

A device for combining and mixing liquids and particularly for mixing an additive such as fertilizer with water. First and second concentric cylindrical chambers are provided with a water inlet to and an outlet from the inner chambers. A restricted venturi throat is provided at the inlet to the inner chamber so as to develop a pressure differential across it. A connection is provided from the inlet side of the restricted throat into the second chamber and from the second chamber back to the inner chamber beyond the restricted throat. A flow of water is enforced through the second chamber which contains the additive such as fertilizer which is turbulated, entrained, and then carried into the outlet stream of water.

8 Claims, 5 Drawing Figures

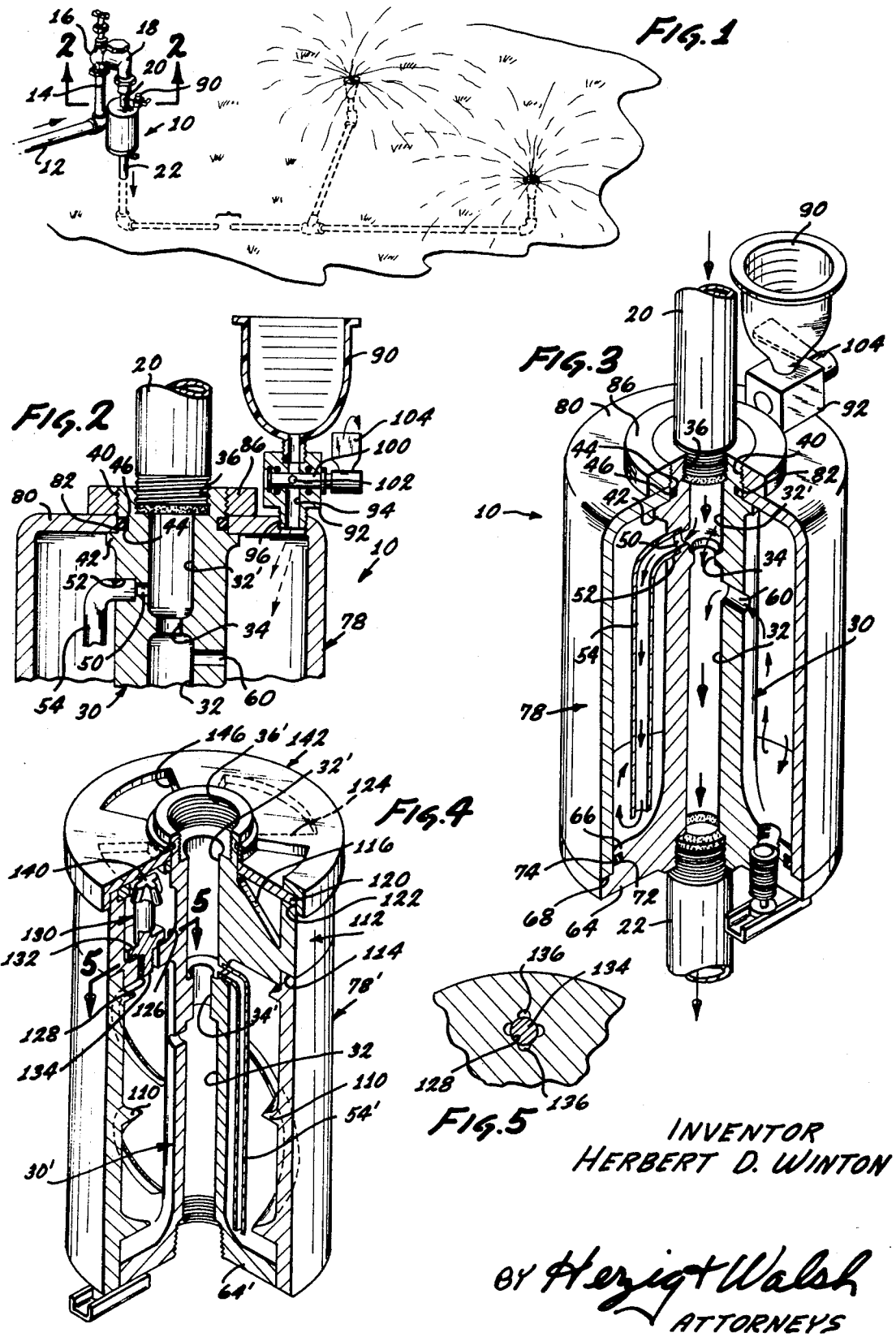

3,753,444

DEVICE FOR COMBINING AND MIXING LIQUIDS

SUMMARY OF THE INVENTION

The invention is an improved and simplified device for entraining an additive into a stream of liquid such as water. In the exemplary form of the invention as described in detail herein, it is adapted as an improved automatic device for entraining an additive such as fertilizer into a stream of water used for irrigation. The invention could be adapted for entrainment of other materials into other liquids.

In the exemplary form of the invention, it is highly adapted for use in irrigation systems for adding the fertilizer or chemical to the irrigation water. It is of course desirable that simple means be available for accomplishing this purpose and with minimum effort on the part of the user. The device provides a device which accomplishes this purpose.

The exemplary form of the invention takes the form of a unit or cartridge that can be simply connected into the line leading into the irrigation water distribution system. In the preferred form, the unit or cartridge is in the form of a first tubular chamber centrally positioned within a cylindrical housing providing a second chamber which is annular between the first chamber and the housing. An inlet water connection is made to one end of the unit or cartridge and an outlet water connection is made at the other end. Provided in the inlet to the first chamber, there is a restricted venturi throat so that a drop in pressure is produced across this throat. There is provided ahead of the throat a tubular connection from the inlet to the second chamber, that is, the annular chamber. Further connection is provided by way of an orifice which provides communication from the annular chamber to the first chamber on the downstream side of the restricted venturi throat. Because of the pressure drop across the throat, flow of water is forced from the inlet through the annular chamber and back into the stream of water on the downstream side. The additive, which is the fertilizer is provided in the annular chamber wherein it is entrained with the liquid, mixed, turbulated, and then fed into the stream of water going into the system.

Preferably, additional chamber means are provided for admitting measured quantities of additive or fertilizer to the second chamber.

In the light of the foregoing, the primary object of the invention is to provide a simplified, inexpensive, but very effective unit or cartridge for accomplishing the purpose of entraining an additive into a liquid such as fertilizer into irrigation water or the like.

A further object is to provide a device as in the foregoing object comprised simply of a first tubular chamber concentrically positioned within a cylindrical housing providing an annular turbulating and mixing chamber.

Another object is to provide a device as in the foregoing wherein a restricted venturi throat is provided in the inlet to the inner chamber so that a pressure drop is provided across it with connections providing for flow of liquid from the upstream side of the venturi throat to the downstream side through the annular chamber for entraining and mixing the fertilizer with the water.

BRIEF DESCRIPTION OF THE DRAWINGS

Further objects and additional advantages of the invention will become apparent from the following detailed description and annexed drawings, wherein:

FIG. 1 is a diagrammatic view of the invention embodied in an irrigation system, FIG. 2 is a partial sectional view of a preferred form of the invention;

FIG. 3 is perspective view, partly broken away of the invention shown in FIG. 2;

FIG. 4 is a partially broken away perspective view of a modified form of the invention; and FIG. 5 is a sectional view taken along the line 5—5 of FIG. 4.

DESCRIPTION OF THE PREFERRED EMBODIMENT

Referring to FIG. 1 of the drawings, a preferred form of the unit or cartridge of the invention is designated generally at 10 connected in an irrigation system supplied with water by way of pipe 12, and a connection pipe 14. In this pipe is a manual valve 16 controlling flow through a fitting 18 which is coupled to the upper end of the unit 10 by way of pipe 20. The outlet pipe from the cartridge is designated at 22 and it connects to the irrigation system shown in outline, there being branch connections to various sprinkler heads.

FIGS. 2 and 3 illustrate the unit 10 in greater detail. These figures show a preferred construction of the invention. As shown in these figures, there is provided an inner elongated tubular member 30 having a bore 32 forming a first chamber. This member may be made from plastic or metal or other suitable material. The upper end part of the bore is designated by 32', there being a short bore forming a restricted venturi throat as designated at 34 between the bore portions 32 and 32'. At the upper end of bore 32', is a threaded counterbore 36 which receives the connecting pipe 20. The upper end of the member 30 is externally threaded as shown at 40. There is a flange 42 adjacent to which is an annular groove which receives an O-ring 46.

Communicating with the bore 32' is transverse bore 50 connecting with counterbore 52 to which is fitted the end of tubular pipe connection 54 which will be referred to again presently. Numeral 60 designates a transverse bore or port communicating with bore 32, and the exterior of the member 30 and which will be referred to again presently.

The lower end part of member 30 is of enlarged cylindrical form as designated at 64. The upper part of the end portion 64 as shown at 66 is of smaller diameter, there being a shoulder 68 between these portions. Formed in the upper part 66 is an annular groove 72 receiving a sealing O-ring 74.

Numeral 78 designates a cylindrical container housing which may be made of plastic or of other suitable material which has a top part 80 with a bore or opening 82 in it. The upper end of part 30 extends through this bore, and the part 30 is clamped to the cylinder 78 by nut 86 with the inner edges of the bore 82 in the top 80 sealing against the O-ring 46 in the annular groove 44.

The lower end of the cylindrical casing or housing 78 is open and it has an inner diameter to fit down over the upper portion 66 at the bottom of part 30 as to engage the shoulder 68 and to seal against the O-ring 74 as shown. As may be observed, the housing 78 and the inner member 30 provide an annular chamber between them. Tube 54 extends down to the lower part of the annular chamber between parts 30 and 78.

Numeral 90 designates a measuring cup or funnel with which the liquid additive can be filled and transferred to the annular chamber around the inner member 30. This cup is threaded into a fitting 92 which has a bore 94 extending through a threaded nipple 96 on the fitting, which is threaded into a threaded bore in the top 80 of the housing 78. The fitting 92 has a valve in it formed by a rotatable stem 100 having a bore 102 in it which can be moved angularly to cmplete or open the passageway from the cup 90 to the bore 94 into the annular chamber around member 30. On the end of the stem 100 is a manual actuating handle 104.

The operation of the device as so far described is as follows. Measured amounts of liquid additives such as fertilizer can be placed into the cup or funnel 90, and valve 100 is then opened to allow this measured amount of additive to drain down into the annular chamber between the casing 78 and the member 30. The device is coupled into the water lines 20 and 22 as described and as shown to allow the water to flow to it. The restricted venturi throat 34 causes a pressure differential to appear or be produced across it. It enforces a flow of incoming water from the line 20 into the tubular connection 54 and down into the lower part of the annular chamber. Then, this water turbulates and mixes with the additive and entrains the additive. Then, the mixture flows inwardly through the channel or port 60 and back into the bore 32 in part 30 and then flows out through the outlet connection 22.

Thus, it is to be seen that although the device is of very simple construction, it is economical to fabricate. Nevertheless, it provides pressure induced circulating flow and part of the water flow agitates and entrains the fertilizer and turbulates the mixture. It then brings it back into the water line, being discharged through the branches to the spray heads.

FIGS. 4 and 5 show a modified form of the invention which differs in certain respects. Corresponding parts are identified by the same reference characters primed, the foregoing description being applicable whenever suitable and appropriate.

The inside surface of the container 78 has a helical vane in it to insure rotary circulation and turbulation of the water and additive within the container. The bottom 64 of member 30' fits into the bottom end of the container 78'.

The top part of the part 30' is formed as the body 112, the lower edge of which has an annular cut-out as shown at 114 which forms a square shoulder. The top edge of the container 78' fits into this annular cut out as shown with the outside surfaces being flush. The body 112 is cylindrical, having the same outside diameter as the container 78'. The body 112 is integral with the part 30' and constitutes the upper part of if as shown. Formed in this body part is an annular cavity which is in the material around the bore 32'. This cavity at one end having a slanting bottom surface is designated at 116 in FIG. 4. The top end of the body 112 is closed by a disc 120, peripheral portions of which fit into an annular cut-out 122, on the inside of the cavity previously described. This disc has two oppositely disposed cut-outs or openings in it. These openings have radial side edges with arcuate side edges extending between the radial edges. The cavity in one part of the body 112 has a flat bottom as designated at 126. Numeral 128 designates a bore providing communication between the cavity and the annular chamber within the casing 78'. Numeral 130 designates a manually operable valve member in the form of a cylindrical stem having a flat cylindrical part 132 and extended threaded part 134 which can thread into the bore 128, there being additional semi-circular bores equally spaced around the periphery of the bore 128, as designated at 136. On the lower side of the flat circular part 132, there is a sealing O-ring which can seat on the bottom 126 of the cavity. At the upper end of the stem of the valve 130, there is a knob 140.

Numeral 142 designates a cylindrical cap or cover with an edge flange which can fit down over the top of the cylindrical body 112. It has two oppositely disposed openings in it, one of which is designated at 146. These openings have radial side edges and arcuate side edges extending between the radial side edges as shown. This cap is rotatable in order to bring its openings or cut-outs into registry with similar openings or cut-outs in the disc 120. This provides access for pouring liquid additive through the registering openings into the top cavity in the body 112 and also allowing access to the manual knob 140 for turning the valve member 130 to open it, that is, to move the flat circular part 132 away from its seat on the bottom 126 of the cavity to allow the additive to run down into the additive chamber through the bores 136 previously described.

From the foregoing, those skilled in the art will readily understand the construction and operation of the modification of FIGS. 4 and 5, the operation being like that of the previous modification. In this modification, the measured amount of liquid additive is put directly into the cavity provided in the body 112 as described. Then, after the measured amount is put in, it can be allowed to run directly down to the annular chamber inside of casing 78' by opening valve 130.

From the foregoing, those skilled in the art will readily understand the nature and construction of the invention and the manner in which it achieves and realizes all of the objects and advantages as set forth in the foregoing.

The foregoing disclosure is representative of preferred forms of the invention and is to be interpreted in an illustrative rather than a limiting sense, the invention to be accorded the full scope of the claims appended hereto.

What is claimed is:

1. A device for entraining an additive into a stream comprising: means forming a first liquid chamber; means forming a second liquid chamber concentrically around the first chamber; means forming an inlet to said first chamber; means providing a restricted throat for liquid entering the first chamber whereby a pressure differential is established across the throat; means providing communication of liquid downwardly from said inlet to said second chamber ahead of said throat; and means providing communication upwardly in said second chamber to said first chamber on the downstream side of said restricted throat whereby liquid circulating through said second chamber entrains additive contained therein and carries it into the stream of liquid on the downstream side of the restricted throat.

2. A device as in claim 1, having tubular means for conveying liquid from said inlet to an end part of said second chamber.

3. A device as in claim 1, including means to enforce turbulation and mixing of liquid and additive in said second chamber.

4. A device for entraining an additive into a stream comprising: means forming a first liquid chamber; means forming a second liquid chamber; centrically around the first chamber; means forming an inlet to said first chamber; means providing a restricted throat for liqud entering the first chamber whereby a pressure differential is established across the throat; means providing communication of liquid from said inlet to said second chamber ahead of said throat; and means providing communication from said second chamber to said first chamber in the downstream side of said restricted throat whereby liquid circulating through said second chamber entrains additive contained therein and carries it into the stream of liquid on the downstream side of the restricted throat, and funnel means for containing additive and a means providing communication from the funnel means for allowing the additive to drain into said second chamber.

5. A device as in claim 1, wherein said first chamber is of elongated tubular construction and said second chamber is of cylindrical form surrounding said first chamber providing an annular chamber in between.

6. A device for entraining an additive into a stream comprising: means forming a first liquid chamber; means forming a second liquid chamber: centrically around the first chamber; means forming an inlet to said first chamber; means providing a restricted throat for liquid entering the first chamber whereby a pressure differential is established across the throat; means providing communication of liquid from said inlet to said secod chamber ahead of said throat; and means providing communication from said second chamber to said first chamber on the downstream side of said restricted throat whereby liquid circulating through said second chamber entrains additive contained therein and carries it into the stream of liquid on the downstream side of the restricted throat, said means forming said second chamber comprising partition means forming a third chamber therein with control means for providing communication of additive from the third chamber to said second chamber.

7. A device as in claim 6 wherein said means forming said second chamber is cylindrical and means comprising a circular cap for one end thereof.

8. A device as in claim 7, including valve control means providing communication between said third and second chambers, said circular cap having an opening therein and said cap being adjustable to a position to provide access to said valve means.

* * * * *